A. FROST.
QUARTZ GLASS MAKING MACHINE.
APPLICATION FILED NOV. 3, 1916.
1,232,785.
Patented July 10, 1917.
3 SHEETS—SHEET 3.
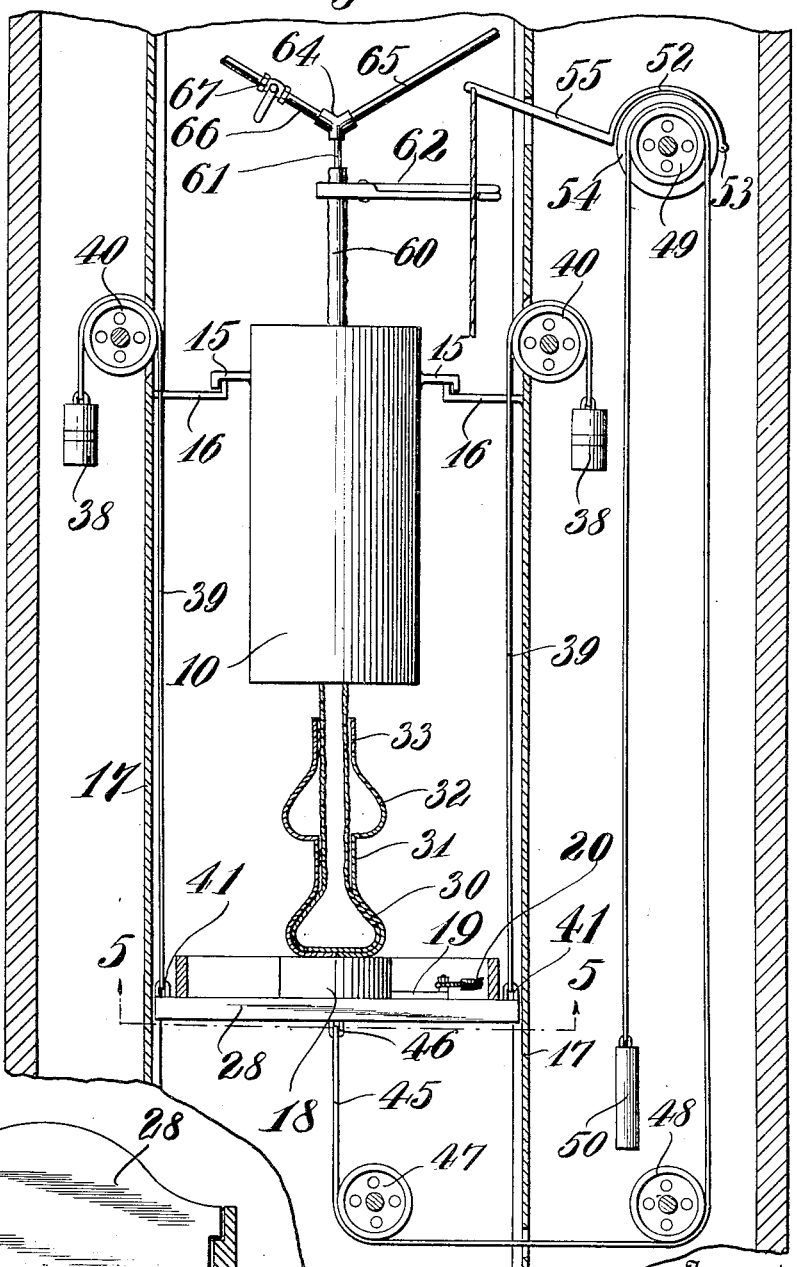
Inventor
Armin Frost
By his Attorney
Oscar Geier

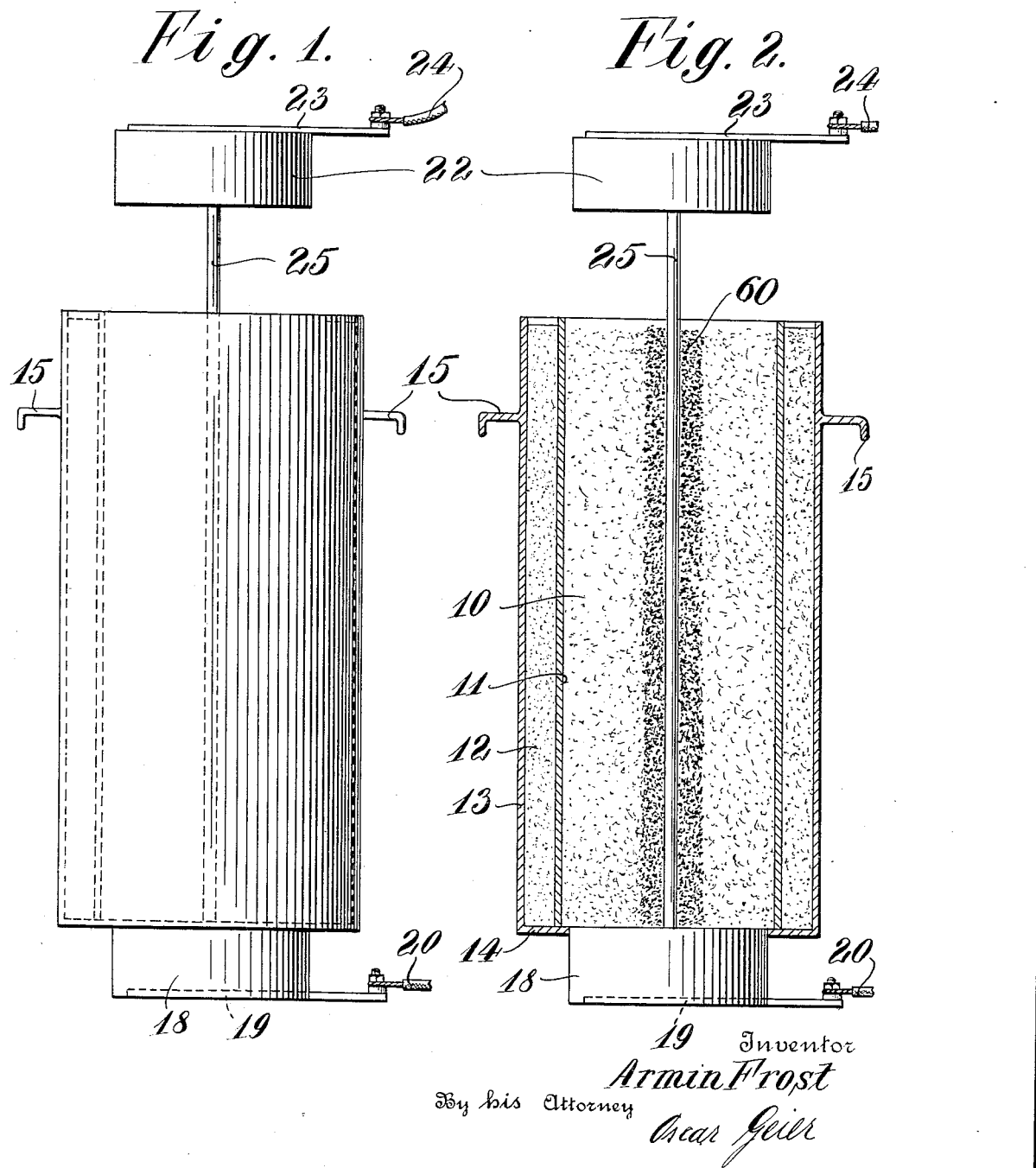

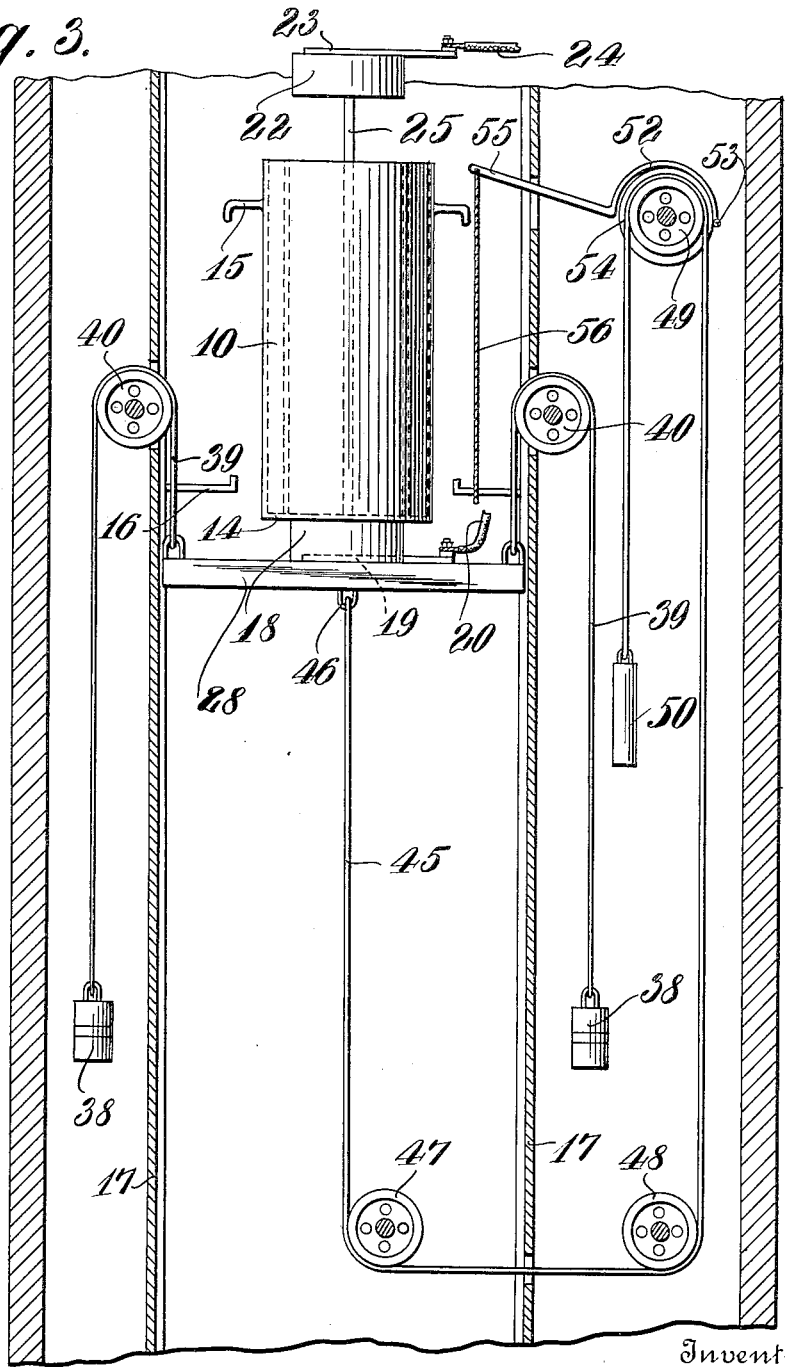

UNITED STATES PATENT OFFICE.

ARMIN FROST, OF NEW YORK, N. Y.

QUARTZ-GLASS-MAKING MACHINE.

1,232,785.  Specification of Letters Patent.  Patented July 10, 1917.

Application filed November 3, 1916. Serial No. 129,279.

*To all whom it may concern:*

Be it known that I, ARMIN FROST, a subject of the Emperor of Germany, resident of New York, county of New York, and State of New York, have invented certain new and useful Improvements in Quartz-Glass-Making Machines, of which the following is a specification.

This invention relates to improvements in apparatus for the construction of quartz glass articles, as tubes, flasks, etc., and has as its principal object, the provision of means whereby vessels of a substantially cylindrical character may be formed with walls of a uniform thickness, the apparatus working in a vertical plane as distinguished from the ordinary horizontal apparatus for similar purposes.

A further object is to provide an apparatus using an electric current for the heating means, the same being arranged to pass through the chamber containing the material from which the glass is made, and a still further object is to provide an apparatus that is readily controllable both as to the degree of heat necessary and also the position and operation of its component parts.

These and other like objects are attained by the novel construction and combination of parts hereafter described and shown in the accompanying drawings, forming a material part of this disclosure, and in which:—

Figure 1 is a side elevational view of the melting chamber indicating the electrical attachments thereto.

Fig. 2 is a vertical sectional view taken through the center line of the same.

Fig. 3 is a partial sectional and side elevational view showing the arrangement of the assembled parts.

Fig. 4 is a similar elevational and sectional view showing the parts in a different position, and indicating the manner of molding certain forms as crucibles, dishes or bottles, and Fig. 5 is a sectional view taken on line 5—5 of Fig. 4.

In the construction indicated, the glass melting chamber 10 is shown to be of cylindrical construction, comprised of a wall 11, surrounding which is a space 12 enveloped by the outer wall 13.

Filled in the space 12 and acting as a non-conducting lining between the walls 11 and 13 is a quantity of sand or the like, the same resting upon the base or bottom element 14, which extends slightly within the diameter of the walls 11, and is open at the top for the purpose of filling.

A pair of hooks 15 are formed upon the opposite sides of the outer wall 13 and adapted to engage with supports 16 secured to uprights 17, as best shown in Fig. 4.

The glass making material, which in this case is largely comprised of quartz, in a pulverized condition, or glass sand, is filled into the chamber 10 to such a height as may be desired, the lower end resting upon the graphite electrode 18, in which is inserted a metallic plate 19 communicating at one end with the wire 20 leading from any convenient source of electrical energy.

A similar electrode or terminal 22 is disposed above the cylinder, connected by a plate 23 with the wire 24, leading to the other pole of the electric energy, and connecting between the electrodes 18 and 22, is a graphite rod 25 which passes centrally through the chamber 10. Thus, when the current is turned on, forming a circuit, the rod 25 is heated, by means of which the glass is melted.

When sufficient heat has been generated to melt the central portion or core 60, a tube 61 is entered into the opening from which the rod 25 has been extracted, the upper end of the core being grasped by the tongs 62 or other similar appliance closing the opening through the core tightly upon the tube 61 so that as the elevator plate 28 upon which the electrode 18 rests, is lowered, the core is extended through the top of the chamber 10 in the form of a tube, the upper end adhering to the pipe 61 which is connected by means of the Y element 64, to a blow pipe 65 in one of its openings by means of which the tube may be expanded to a desired diameter, or by means of the other opening in which a pipe 66 is engaged, the pipe having a control valve 67 and leading from a source of compressed air.

Thus it will be evident that by adjusting the heat according to requirements, the air blast delivered through the pipe 61 and also the speed of lowering the melting chamber 10, that walls of any desired thickness may be obtained.

When the melting chamber has been lowered, so that the hooks 15 engage with the supports 16, the chamber is prevented from moving farther downward, although the electrode 18 and elevator plate 28 may descend farther, the tube 60 being pressed downwardly into the molds 30 and 32 having neck portions 31 and 33, and by continuing the current of compressed air, the tube is expanded and caused to take the shape of the mold 30—31 and afterward filling the upper mold 32—33, as will be clearly apparent.

The elevator plate 28 is counterbalanced by means of the weights 38, to which are attached cables 39 running over pulleys 40, and attached by means of the eyes 41 to the platform. The cable 45, attached to the central eye 46 below the elevator 28 runs under pulleys 47 and 48 respectively, thence over the pulley 49 to a weight 50, thus providing means whereby, upon a slight exertion, the platform 28 may be raised or lowered to a desired height.

A brake band 52, pivoted at 53, is adapted to make contact with the drum 54, mounted on the shaft with the pulley 49, the brake band being operated through the lever handle 55 to which is attached an operating cable 56 extending to a point convenient of access.

In operation, the cylindrical chamber 10 is filled with the material from which the tubes or other vessels are to be formed, the space 12 being similarly filled so as to prevent radiation and loss of heat, whereupon the electric current is turned on, the same entering the apparatus through the wires 20 and 24, heating the graphite rod 25, disposed between the electrodes 18 and 22, so that when the current has developed a certain degree of heat, and for a sufficient length of time to melt an annular core surrounding the rod, it is turned off and the furnace withdrawn from the upper electrode by lowering the elevator upon which the melting chamber rests.

In the opening at the top of the tube formed by the core, after the graphite rod has been withdrawn, is inserted the blow pipe 61, the tube being tightly closed upon it, so that no air can escape and the desired thickness of the tube attained by the proper lowering of the elevator, taken in connection with the admission of the compressed air, causing the tube to be formed uniformly thick and straight.

The molten glass still remaining on the electrode 18 in the melting chamber is let down by the elevator and inclosed in molds of the proper shape, the glass being forced outwardly by the compressed air entering through the pipe 61.

Thus it will be seen that a melting furnace is disclosed in which the molten glass is removed directly vertical from the furnace as opposed to horizontal furnaces, in which it is difficult to obtain a cylindrical tube having walls of any desired uniform thickness.

Having thus described my invention, what I claim as new and desire to secure by Letters Patent, is:—

1. In an apparatus of the class described, the combination with a melting chamber, a non-conducting lining surrounding said chamber, a pair of electrodes above and below said chamber, a graphite rod connecting therebetween, a source of electrical energy in circuit with said electrodes, an elevator upon which said chamber rests, means for operating said elevator, and means for independently supporting said melting chamber.

2. In an apparatus of the class described, the combination with a vertically movable plate, means for counterbalancing said plate, a melting furnace normally resting upon said plate, a source of electrical energy, a pair of electrodes, one above and the other below said melting chamber, a graphite rod connecting therebetween, means for intercepting the lowering of said melting chamber, a source of compressed air, a pipe leading therefrom, and molds adapted to receive the molten glass from said chamber, said molds resting upon the lower electrode.

In testimony whereof I have affixed my signature this twenty-first day of October, 1916.

ARMIN FROST.